G. KINSEY.
SNELL FASTENING FOR FISH HOOKS.
APPLICATION FILED DEC. 5, 1913.
1,093,000.
Patented Apr. 14, 1914.
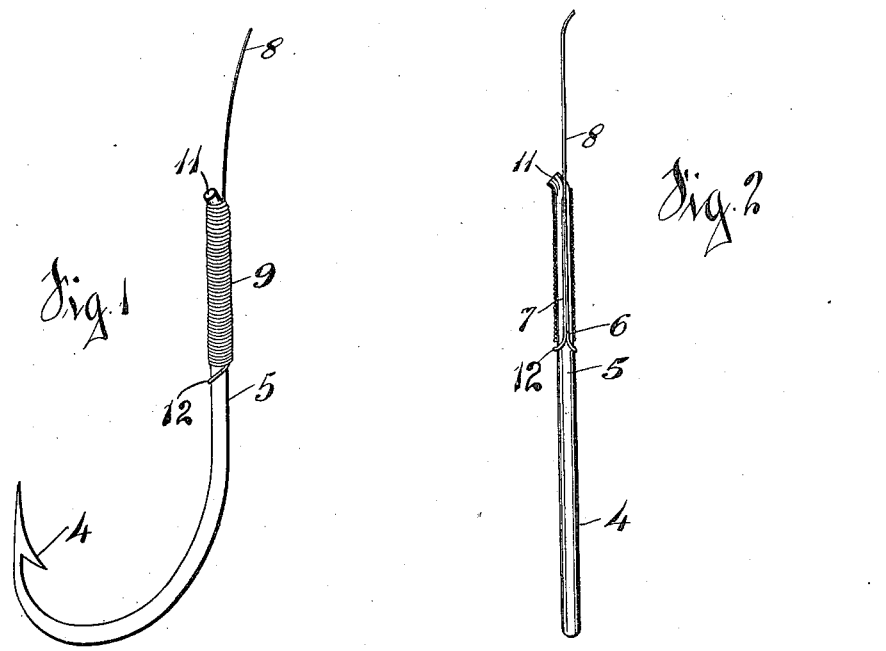
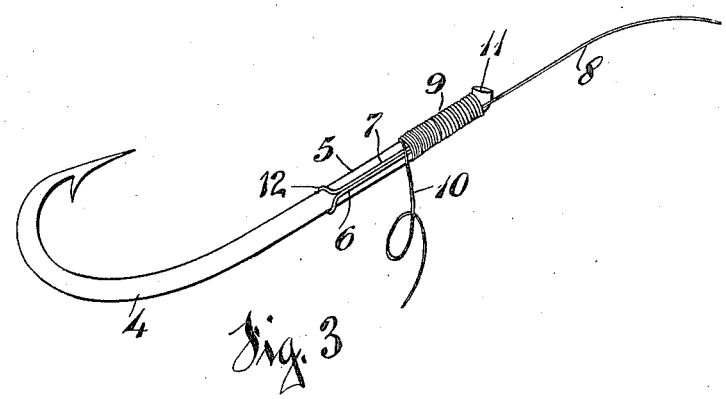
Witnesses
C. Thornton Bogert
Bertha R. Kropf
Inventor
George Kinsey
By Walter F. Murray
Attorney

UNITED STATES PATENT OFFICE.

GEORGE KINSEY, OF WYOMING, OHIO.

SNELL-FASTENING FOR FISH-HOOKS.

1,093,000.  Specification of Letters Patent.  Patented Apr. 14, 1914.

Application filed December 5, 1913. Serial No. 804,797.

*To all whom it may concern:*

Be it known that I, GEORGE KINSEY, a citizen of the United States of America, and resident of Wyoming, county of Hamilton, and State of Ohio, have invented certain new and useful Improvements in Snell-Fastenings for Fish-Hooks, of which the following is a specification.

My invention relates to improvements in snell fastenings for fish hooks, and has for an object to produce a fastening which will positively prevent the disengagement of the snell from the hook and which may be simply and rapidly applied to any hook. This and other objects are attained in the fastening described in the following specification, and illustrated in the accompanying drawings, in which, Figure 1 is a side elevation of a fish hook and snell embodying my invention. Fig. 2 is a view of the back of the hook with the snell fastening means in section to show the location of the snell on the hook. Fig. 3 is a perspective view of the hook and snell, showing same in the process of securing the snell to the hook.

The hook 4 may be of ordinary form, having a shank 5, which is provided with an abutment 11 for holding the wrapping thereon. The snell or connective 6, which is secured to the shank of the hook, is of so-called cat-gut or other ligament such as is commonly used. In the snell is formed a loop 12, which embraces the shank 11 of the hook and which, at its middle point, preferably contacts the front of the shank. The doubled ends or branches 7 and 8 of the snell contact with the back of the shank, one end 7 terminating at the end of the shank, and the other end 8 extending beyond the shank, to provide a means to which the fish line may be attached. The end 7 may be continued to form a double snell, if desired. It will, of course, be understood that the shank may be given a coat of varnish, or other adhesive, as is ordinarily done previous to attaching the snell. After having located the snell on the shank, the binding or wrapping 9 is wound over the shank and snell. This snell wrapping consists of fine thread 10, which is preferably of waxed silk, as is ordinarily employed for such purposes. The manner of winding the thread and the manner of securing the ends of the thread may be the same as that well known in the art. After finishing the winding of member 9, the entire fastening may be given a coat of varnish, in order to make it waterproof.

In use the fish line is attached to the long end 8 of the snell, and when force is exerted upon the hook or upon end 8 of the snell, the loop is tightened about the shank, and hence prevents the snell from being separated from the hook.

I do not desire to claim as my invention the use of any of the materials herein mentioned, or the particular manner of wrapping the thread upon the shank of the hook, to secure the snell in place, but What I do claim is:

1. The combination of a fish hook, a snell and means for securing the snell to the hook, the snell having a loop at its lower end surrounding the shank, and the means comprising a binding material wrapped about the snell and the shank of the hook between the end of the shank and the loop.

2. A snell fastening for fish hooks, comprising a snell and a means for securing the snell to the shank of the hook, the snell being looped around the shank with its ends brought to contact with and to lie parallel to the shank of the hook.

3. The combination of a connective, a shank and a wrapping material, the connective being doubled to form a loop and two branches, the loop embracing the shank, and the branches of the connective contacting a side of the shank, the wrapping surrounding the branches of the connective and the shank between the loop and the end of the shank.

4. A snell fastening for fish hooks, comprising a snell and means for securing the snell to the shank of a hook, one end of the snell terminating near the end of the shank, the other end extending parallel to the shank to a point midway between the end of the shank and the hook, then encircling the shank, the second-mentioned end extending toward the end of the shank parallel to and in contact with the first-mentioned end of the snell.

In testimony whereof, I have hereunto subscribed my name this 3rd day of December, 1913.

GEO. KINSEY.

Witnesses:
WALTER F. MURRAY,
W. THORNTON BOGERT.

---

Copies of this patent may be obtained for five cents each, by addressing the "Commissioner of Patents, Washington, D. C."